US012036162B1

(12) United States Patent
Toms et al.

(10) Patent No.: US 12,036,162 B1
(45) Date of Patent: Jul. 16, 2024

(54) MECHANICAL PRESSURE CONTROL FOR MATTRESS FOR USE FOR MEDICAL PURPOSES

(71) Applicant: LINET spol. s r.o., Slaný (CZ)

(72) Inventors: Martin Paul Toms, Hampshire (GB); Ian Ryall, Hampshire (GB)

(73) Assignee: Linet spol. s r.o., Slany (CZ)

( * ) Notice: Subject to any disclaimer, the term of this patent is extended or adjusted under 35 U.S.C. 154(b) by 283 days.

(21) Appl. No.: 17/697,534

(22) Filed: Mar. 17, 2022

Related U.S. Application Data

(60) Provisional application No. 63/168,289, filed on Mar. 31, 2021.

(51) Int. Cl.
*A61G 7/057* (2006.01)
*A61G 7/015* (2006.01)

(52) U.S. Cl.
CPC ......... *A61G 7/05769* (2013.01); *A61G 7/015* (2013.01)

(58) Field of Classification Search
USPC .... 137/532, 533, 533.21, 534, 542, 543, 43; 222/500
See application file for complete search history.

(56) References Cited

U.S. PATENT DOCUMENTS 5,894,966 A * 4/1999 Bobey .................. A61G 7/0507 5/624
2012/0317720 A1* 12/2012 Chiang .................... A61G 7/02 5/713

FOREIGN PATENT DOCUMENTS

WO WO-2022208163 A1 * 10/2022

* cited by examiner

*Primary Examiner* — Justin C Mikowski
*Assistant Examiner* — Adam C Ortiz
(74) *Attorney, Agent, or Firm* — Thedford I. Hitaffer; Hitaffer & Hitaffer, PLLC

(57) ABSTRACT

A hospital bed has an inclinable backrest, a pneumatic mattress, and an automatically acting mechanical air pressure control for the mattress. The pressure control includes a gravity responsive valve between the backrest and another zone of the mattress. A weighted mass in the pressure control urges the valve to move to a desired position and may counter a biasing member acting on the valve. The weighted mass may prevail against the biasing member when the backrest is upright but may yield to the biasing member when the backrest has been lowered. With the backrest upright, pneumatic cells of the backrest may be isolated from the other zone of the mattress. With an air source arranged to inflate the other zone, that portion of the mattress exposed to greater weight of a patient, as would occur with the backrest upright, enjoys increased air pressure.

10 Claims, 4 Drawing Sheets

MECHANICAL PRESSURE CONTROL FOR MATTRESS FOR USE FOR MEDICAL PURPOSES

CROSS-REFERENCE TO RELATED APPLICATIONS

This application claims priority to U.S. Application No. 63/168,289, filed on Mar. 31, 2021, the disclosure of which is incorporated herein by reference in its entirety.

BACKGROUND OF THE INVENTION

The invention relates in general to mattresses for medical or hospital beds, and more particularly, to control of pneumatic pressures imposed on selected portions of a mattress.

In medical and other similar settings, beds often comprise mattresses having pneumatically inflated cells for supporting the weight of a patient on the bed. One such mattress is a reactive mattress, which may be comprised of foam and pneumatic components, which are adapted to provide passive and active therapy. Such a mattress may be comprised of pneumatic cells filled with foam, which provides passive therapy in the form of pressure redistribution in a non-powered mode by allowing air to move from cell to cell in reaction to the patient's body movement and weigh to minimize both intensity and duration of pressure exposure to vulnerable skin sites that are not adapted to sustained and/or excessive loading. The mattress can be a hybrid mattress, which can be connected to an air source (e.g., a compressor, pump or other suitable air source) to provide active therapy, such as alternating pressure therapy, to enhance and optimize pressure redistribution and pressure injury prevention. During alternating pressure therapy, the air source inflates and deflates the pneumatic cells to maintain a desired pressure regardless of the patient's weight and position. As a further note, the mattress may be fully active, relying on the air source for maintaining pressure in the mattress, and having no foam in the cells. Such mattresses are often comprised of individual cells, which may extend laterally of the mattress (i.e., in a side-to-side direction) and/or longitudinally of the mattress (i.e., in a lengthwise direction), and zones, such as, for example, back, seat and leg zones, which may correspond to portions of the patient's body.

These mattresses are often used on beds having an adjustable or articulating bed deck supporting a mattress, which includes a backrest section that is movable by virtue of corresponding movement of the bed deck. The backrest section may, for example, be movable from a horizontal position to an inclined position, wherein the backrest section is at some angle inclination relative to the horizontal position. This is commonly referred to as a Fowler position. As the backrest section is moved from the horizontal position to the inclined position, the weight of the patient on the bed shifts, for example, with greater weight borne by the buttocks of the patient and less weight borne by the patient's back. This change requires commensurate control of the pressure in the pneumatic cells in a seat section of the mattress, for example, an increased or sustained pressure in the pneumatic cells of the seat section, which may be lost to the pneumatic cells of the backrest section of the mattress as the angle of inclination of the backrest section increases. This increased or sustained pressure in the pneumatic cells of the seat section is commonly referred to as a Fowler boost. Failure to control this pressure could result in detrimental effects to the patient. One well known hazard is decubitus ulcers, which may develop responsive to excessive weight and therefore, pressure imposed on different body parts, such as, boney prominences of the patient's buttocks. This often occurs when the patient "bottoms out" against the bed deck due to insufficient pressure in the pneumatic cells of the seat section.

In the aforementioned example, it would be desirable to control pressure in pneumatic cells of the seat section of the mattress. Pressure can easily be accommodated by sensing pressures within the various pneumatic cells, sensing the backrest position and using an electronic control system to control or regulate pressures within the various pneumatic cells. However, although this is a frequently employed conventional response to pressure control, it may be objectionable for various reasons. For example, it may require a relatively expensive apparatus distributed about the bed, thereby increasing both cost and complication of the bed, and presenting diverse aspects of the bed that may present problems. Additionally, an electronic control system will not operate in the absence of electrical power, and as a consequence, may be unreliable.

There exists a need for an uncomplicated, low-cost reliable control arrangement to reduce pressure migration from the pneumatic cells of the seat section to the pneumatic cells of the backrest section of an inflatable mattress, effectively providing a Fowler boost.

SUMMARY OF THE INVENTION

The present invention addresses the aforementioned need by providing a mechanical valve assembly configured for use with a bed comprising a pneumatic mattress having a backrest section that is configured to be adjustable at some angle in relation to a seat section. The backrest and seat sections are comprised of pneumatic cells that are in fluid communication with one another. The valve is situated between the pneumatic cells of the backrest and the pneumatic cells of the seat sections to control fluid flow therebetween by use of gravity. As the backrest section is raised, a weight of the valve urges the valve to close, and thereby prevents fluid flow from the pneumatic cells of the seat section to the pneumatic cells of the back section, thus increasing or sustaining pressure in the seat section, effectively achieving Fowler boost.

When the backrest section of the mattress is in a horizontal position, there is no need to control the fluid flow between the pneumatic cells of the backrest section and the seat section of the mattress. Consequently, in this position, gravity does not act on the weight of the valve to cause the valve to close. As a consequence, pressure may be equalized throughout the pneumatic cells of the backrest and seat sections of the mattress.

The valve may be coupled to pneumatic cells of the backrest section within a conduit in fluid communication with pneumatic cells of the backrest section and pneumatic cells of the seat section of the mattress. Locating the valve in relation to the backrest section of the mattress, or a corresponding portion of the bed deck, causes the weight to respond automatically to inclination of the backrest section of the mattress to control the valve accordingly. External connections for signaling and power are eliminated.

BRIEF DESCRIPTION OF THE DRAWINGS

Various features and attendant advantages of the present invention will become more fully appreciated as the same becomes better understood when considered in conjunction with the accompanying drawings, in which like reference characters designate the same or similar parts throughout the several views, and wherein.

The drawings are diagrammatic rather than literal depictions of their content, do not purport to show all structure or every component that would be present in a real-world model, and are not necessarily drawn to scale.

DETAILED DESCRIPTION OF THE PREFERRED EMBODIMENT

Figure 1:
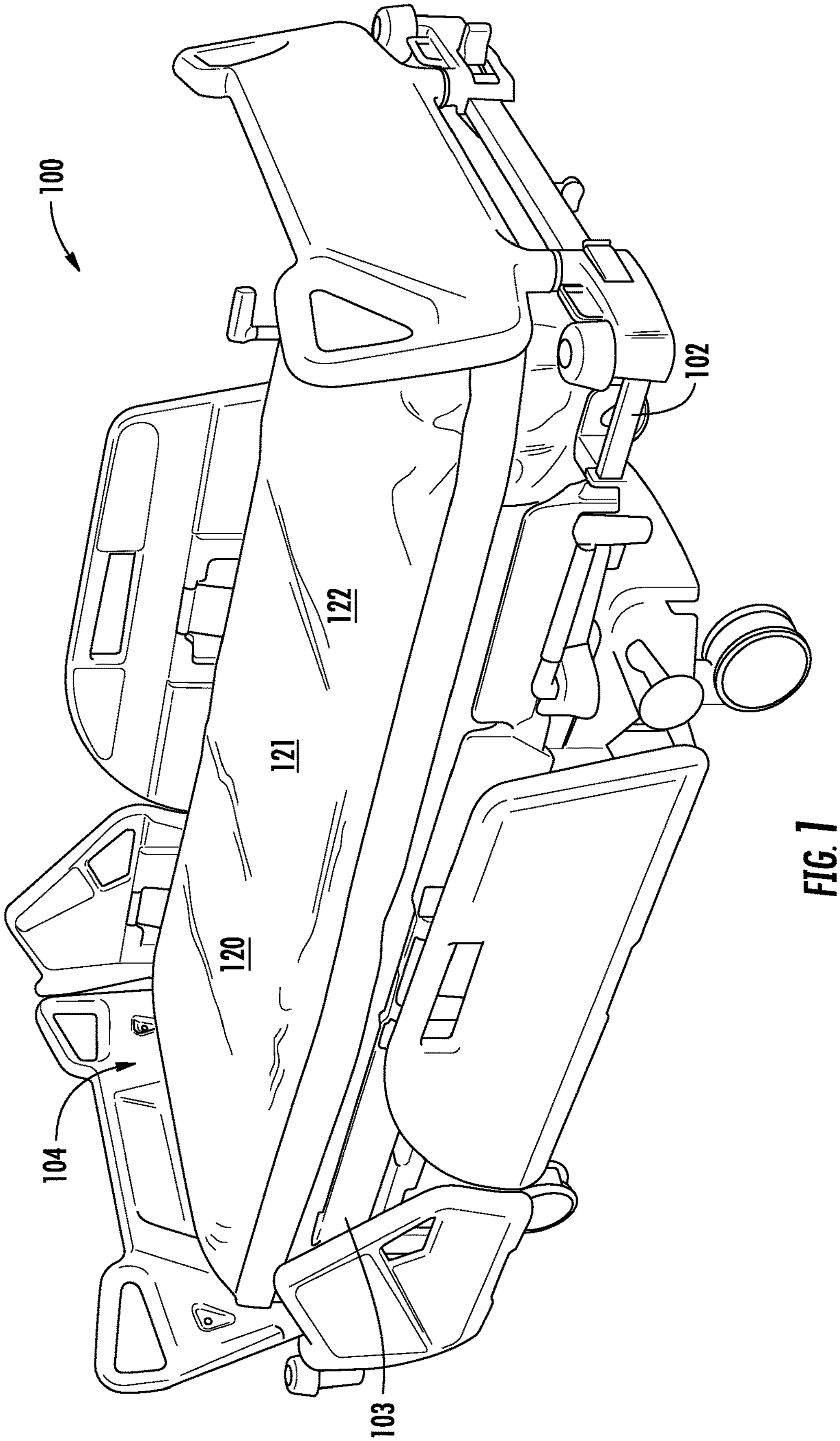
FIG. 1 is a side perspective view of an exemplary bed having a mechanical pressure control for controlling pneumatic pressure of a mattress for use therewith.
Figure 2:
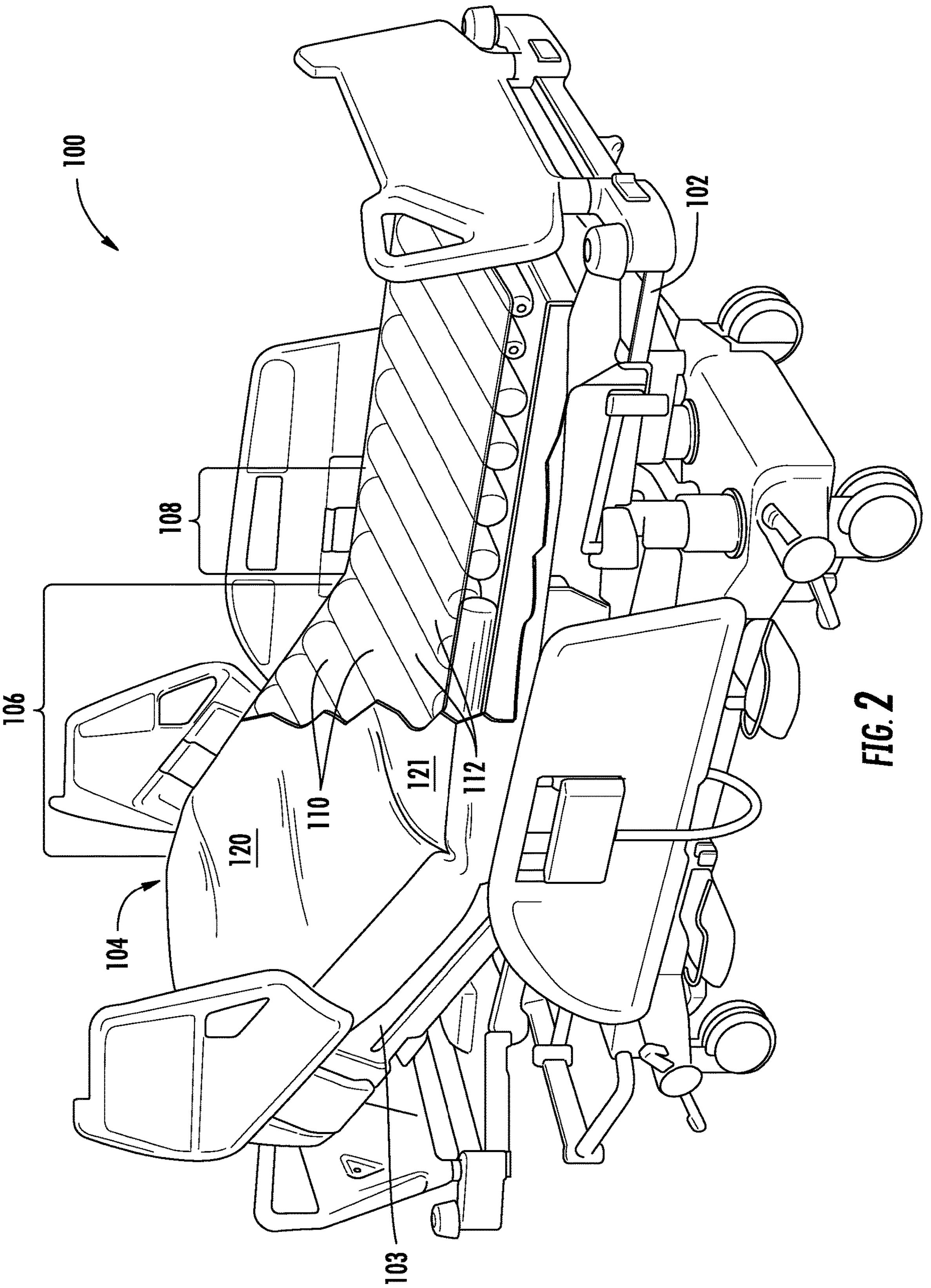
FIG. 2 is a side perspective view of the bed shown in FIG. 1 with a backrest section of the mattress shown in an inclined position.

Referring now to the drawings, there is illustrated in FIGS. 1-2 an exemplary bed 100 comprising a frame 102 for supporting an adjustable or articulating bed deck 103, which in turn supports a pneumatically inflatable mattress 104. The mattress comprises a backrest section 120, which may include a backrest zone 106, and a seat section 121, which may include a seat zone 108. At least one first pneumatic cell 110 is provided within the backrest zone 106. At least a second pneumatic cell 112 is provided within the seat zone 108.

The mattress 104 may be a pneumatically inflatable reactive mattress comprised of pneumatic cells filled with foam, which allows air to move from cell to cell in reaction to the patient's body movement and weight. The mattress can be connected to an air source (e.g., a compressor, pump or other suitable air source) to provide to enhance and optimize pressure redistribution and reduce the risk of pressure injury to the patient. It should be noted that the mattress may be a fully active mattress with no foam component.

Figure 3:
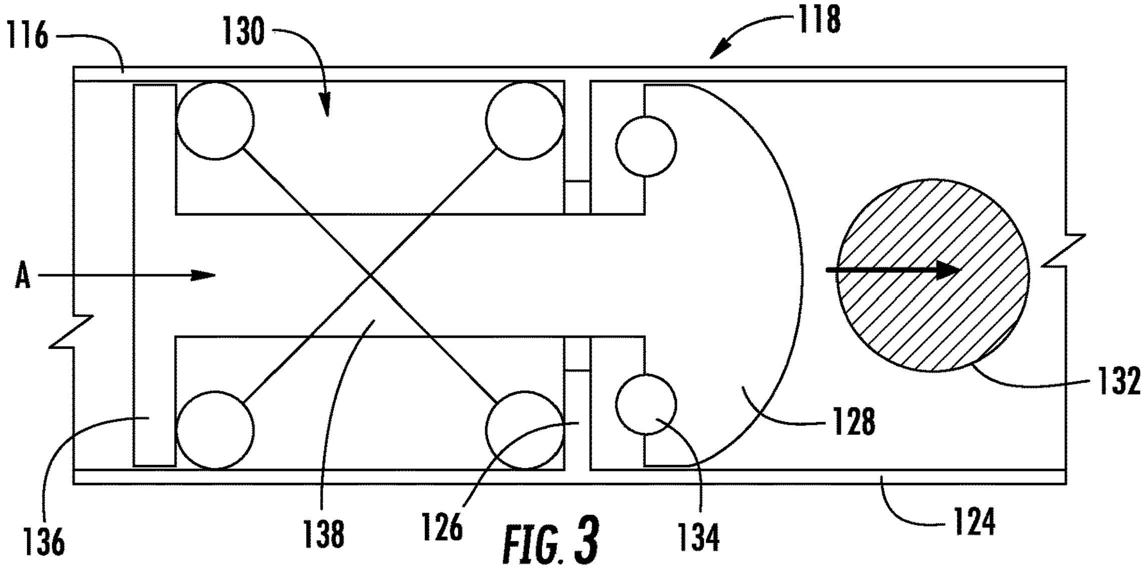
FIG. 3 is an enlarged cross-sectional diagrammatic representation of the mechanical valve assembly shown in FIGS. 1 and 2, illustrating a condition of the valve assembly when the backrest section of the mattress is in the horizontal position shown in FIG. 1.
Figure 4:
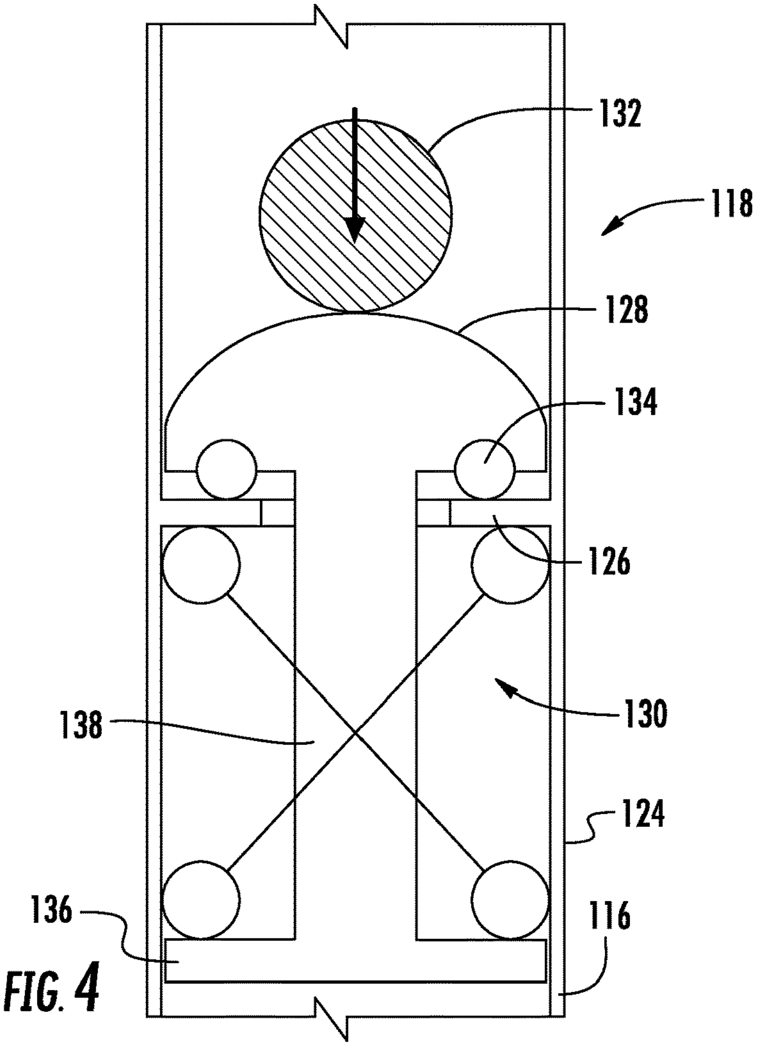
FIG. 4 is similar to FIG. 3 but illustrates the valve assembly when the backrest section of the mattress is in the inclined position shown in FIG. 2.

An air supply manifold or conduit 116, shown in FIGS. 3 and 4, may extend from between the first pneumatic cell 110 and the second pneumatic cell 112, which is adjacent to the first pneumatic cell 110. The conduit 116 may be separate from the cells 110 and 112 (e.g., via tubing connected between the cells 110 and 112) or integral with the cells (e.g., formed between the cells 110 and 112, such as at a joint or joints between the cells 110 and 112).

A mechanical valve assembly 118, shown in FIGS. 3 and 4, may be provided in in the air supply conduit 116 between the first pneumatic cell 110 and the second pneumatic cell 112. The mechanical valve assembly 118 may be supported in relation to the backrest section 120 so as to control air flow via gravitational influence between the seat zone 108 to the backrest zone 106 of the mattress 104 when the backrest section 120 is raised and lowered-Direction of air flow within the air supply conduit 116 and through the mechanical valve assembly 118 is indicated by an arrow A in FIG. 3 when the mechanical valve assembly 118 is open. Air flow within the air supply conduit 116 and through the mechanical valve assembly 118 is prohibited in FIG. 4 when the mechanical valve assembly 118 is closed.

The mechanical valve assembly 118 mechanically controls pneumatic pressure in the mattress 104 automatically in response to gravitational affects as the backrest section 120 pivots from a lowered position shown in FIG. 1 to an inclined position shown in FIG. 2. The backrest section 120 is not necessarily limited to the degree of inclination depicted in FIG. 2. The backrest section 120 may be arranged to pivot to a fully vertical position if desired.

The pneumatically inflatable mattress 104 may have a plurality of first and second pneumatic cells 110 and 112, as shown in FIG. 2. Large portions of the mattress 104 may be identified as zones. Each such zone (i.e., the backrest zone 106 and the seat zone 108, and additional zones where desired) may be comprised of a plurality of cells (i.e., the first and second pneumatic cells 110 and 112, and/or additional cells for additional zones). For example, additional zones may correspond to leg and foot sections 122, shown in FIG. 1.

Unless otherwise indicated, the terms "first", "second", etc., are used herein merely as labels, and are not intended to impose ordinal, positional, or hierarchical requirements on the items to which these terms refer. Moreover, reference to, for example, a "second" item does not either require or preclude the existence of, for example, a "first" or lower-numbered item, and/or, for example, a "third" or higher-numbered item.

The air supply conduit 116 may be understood to encompass a complete system (e.g., a manifold system), which may include several sections of the air supply conduit 116 (e.g., tubing) connecting intervening components, such as the first pneumatic cells 110, the mechanical valve assembly 118, and the second pneumatic cells 112. A portion of a supply conduit 116 is illustrated in FIGS. 3 and 4. Although a single supply conduit 116 is illustrated in FIGS. 3 and 4, for simplicity purposes, it should be understood that a plurality of supply conduits 116 may be provided (e.g., extending along lateral sides of the mattress 104).

It should be appreciated that, instead of forming a part of a manifold system, the conduit 116 may be integral with the pneumatic cells (e.g., pneumatic cells 110 and 112). In this case, the mechanical valve assembly 118 may be positioned in the conduit 116 between the cells (e.g., between a first pneumatic cell 110 and an adjacent second pneumatic cell 112).

As indicated above, the mechanical valve assembly 118 may be supported in relation to the backrest section 120 and configured to automatically control air flow (i.e., by gravitational influence) between the seat zone 108 and the backrest zone 106 when the backrest section 120 moves from a lowered position to a raised position, shown in FIG. 2, and when the backrest section 120 moves from the raised position to the lowered position, shown in FIG. 1. This is further described with particular reference to FIGS. 3 and 4 hereinbelow.

It should be appreciated that the mechanical valve assembly 118 may be supported in relation to the bed deck 103 or the mattress 104. This may be done in any suitable fashion. With the mechanical valve assembly 118 supported in relation to adjacent pneumatic cells 110 and 112 in the backrest and seat sections 120 and 121, air flow between the adjacent cells 110 and 112 may be controlled.

As illustrated in FIGS. 3 and 4, the mechanical valve assembly 118 may comprise a housing 124. A valve seat 126 may be coupled to the housing 124. A push valve 128 may be movable within the housing 124. The valve 128 may be located and configured to enable fluid communication through the housing 124 in an open position, shown in FIG. 3, when the valve 128 has moved away from the valve seat 126, and to stop fluid communication through the housing 124 when the valve 128 seats against the valve seat 126 in a closed position, shown in FIG. 4.

A resilient valve biasing member 130 (e.g., a coil spring) may urge the valve 128 into a normally closed position. The resilient valve biasing member 130 may be in tension when positioned downstream or below the valve seat 126 (to the left of the valve seat 126 when viewing FIG. 3, as shown) or in compression when positioned upstream or above the valve seat 126 (to the right of the valve seat 126 when viewing FIG. 3). In accordance with this embodiment, the mechanical valve assembly 118 may close in the horizontal position in FIG. 3 by influence of the resilient valve biasing member 130 when a desired pressured is reached or achieved in the various mattress sections 120, 121 and 122. Pressure within the mattress 104 (e.g., based on the weight, position and/or movement of the patient) may control the mechanical valve assembly 118 as desired to urge the valve 128 to the opened position.

It be understood that it may be desirable in some instances for the resilient valve biasing member 130 to urge the valve 128 into an open position. For example, the resilient valve biasing member 130 may alternatively be in compression when positioned downstream or below the valve seat 126 (to the left of the valve seat 126 when viewing FIG. 3) or in tension when positioned upstream or above the valve seat 126 (to the right of the valve seat 126 when viewing FIG. 3). In this case, the mattress 104 need not rely on pressure within mattress 104 to control the mechanical valve assembly 118.

A pusher (e.g., mass 132) may be configured to urge the valve 128 to cause the valve 128 to close when the valve 128 is open responsive to gravity when the backrest section 120 moves to a raised position. Notably, gravity acts on the mass 132 to close the valve 128 when the mechanical valve assembly 118 is in the inclined position, shown in FIG. 4. By contrast, gravity does not act on the mass 132 to cause the valve 128 to close when the mechanical valve assembly 118 is in the horizontal position, shown in FIG. 3.

Figure 5:
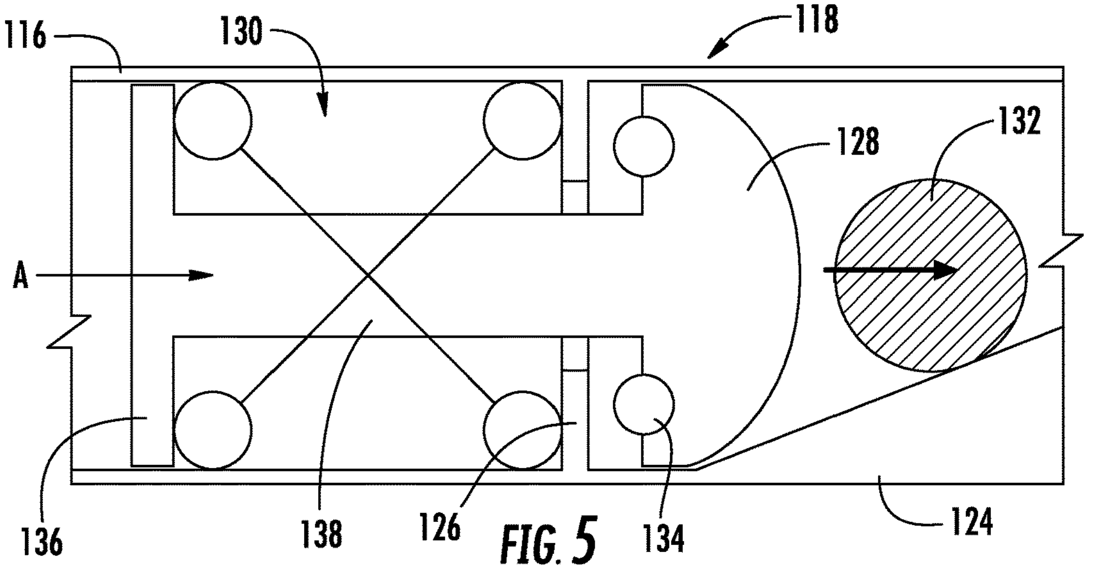
FIG. 5 is an enlarged cross-sectional diagrammatic representation of a mechanical valve assembly similar to that shown in FIGS. 1 and 2 modified to include a ramp surface in the conduit thereof.
Figure 6:
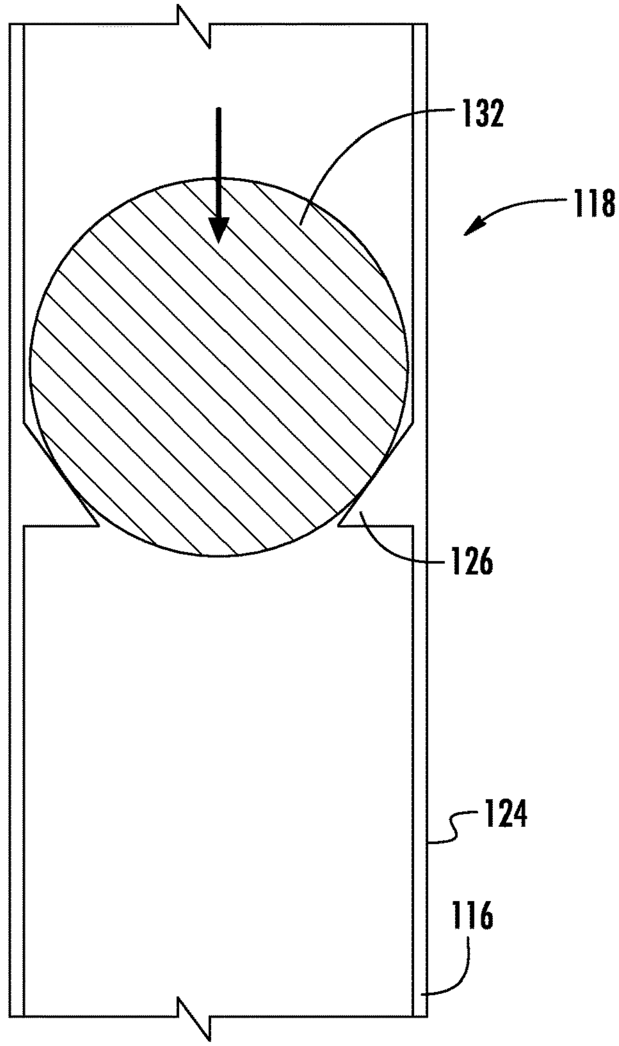
FIG. 6 is valve assembly modified to eliminate a mechanical biasing member for urging the valve to a closed position.

It should be appreciated that the mass 132 may be fabricated from any suitable material, such as, for example, steel or brass, or some other suitable material, and may be weighted as desired. It should also be appreciated that movement of the mass 132 may also be influenced by the shape and/or configuration of the air supply conduit 116 to supplement the gravitational influence. For example, as shown in FIG. 5, the interior of the air supply conduit 116 may be provided with a trigger surface (e.g., a ramp or ramped surface or other suitable shape or configuration) to urge the mass 132 in the direction of the valve 128. It should further be appreciated that the valve 128 may be omitted, together with the resilient valve biasing member 130, spring seat 136 and stem 138, and the valve seat 126 may be shaped and/or configured (e.g., a conical shape, partially spherical shape or some other suitable shape) to cooperate directly with the mass 132 to close the valve 128 when the mechanical valve assembly 118 is in the inclined position, as shown in FIG. 6. Of course, this configuration may be provided with an O-ring or other suitable seal for providing seal between the mass 132 and the valve seat 126. It should be understood that the strength of the resilient valve biasing member 130, the weight of the mass 132, the shape or configuration of the conduit (e.g., the angle of the trigger surface) may be selected to achieved desired effects and/or operation of the mechanical valve assembly 118.

It should be understood that actuation of the valve 128 may be performed by solid components acting under the influence of gravity and may be independent of external power sources, such as electricity. No hydraulic or pneumatic power needs to be applied to the mass 132. It is this combination of characteristics that causes the mechanical valve assembly 118 to be automatically acting and entirely mechanical.

It should also be noted at this point that orientational terms refer to the subject drawing as viewed by an observer. The drawing figures depict their subject matter in orientations of normal use, which could obviously change with changes in posture and position of the bed 110 and its components. Therefore, orientational terms must be understood to provide semantic basis for purposes of description, and do not limit the invention or its component parts in any particular way.

To attain operation described above, the mass 132 may be slidable within the housing 124. The housing 124 may be configured to constrain the mass 132 to slide against the valve 128 when the backrest section 120 is in the inclined position, thereby closing the valve 128, as shown in FIG. 4. The mass 132 may slide away from the valve 128, as shown in FIG. 3, when the backrest section 120 is in the lowered position. This may enable the resilient valve biasing member 130 to open the valve 128 to allow fluid flow between the backrest zone 106 and the seat zone 108. The housing 124 may be configured to enable the mass 132 to slide progressively toward the valve 128 as the backrest section 120 moves from the lowered position to the inclined position.

The housing 124 and the mass 132 may be configured to constrain the mass 132 to slide linearly or otherwise within the housing 124. For example, actual dimensions and configuration of the housing 124 may form a pathway fitting closely yet slidably (or rotationally) to the mass 132, as shown in FIG. 6.

The mechanical valve assembly 118 may further comprise a resilient seal between the valve 128 and the valve seat 126. In the example shown in FIGS. 3 and 4, the resilient seal comprises an O-ring 134. The O-ring 134 may be coupled either to the valve 128, as shown, or alternatively, may be coupled to the valve seat 126. It would also be possible that the O-ring 134 be free floating between the valve 128 and the valve seat 126. Of course, this holds true for the configuration shown in FIG. 6 (i.e., an O-ring or other suitable seal may be provided between the mass 132 and the valve seat 126).

In the examples shown in FIGS. 3-5, the valve 128 may be comprised of a spring seat 136 coupled to the valve 128, for example, by a stem 138 spanning the valve 128 and the spring seat 136 and holding the spring seat 136 at a fixed distance from the valve 128. The resilient valve biasing member 130 may be entrapped between the valve seat 126 and the spring seat 136. The valve 128, the spring seat 136, and the housing 124 may be configured to constrain the valve 128 and the spring seat 136 to remain centered within the housing 124 and to travel linearly or otherwise therein, thereby enhancing sealing of the valve 128 relative to the valve seat 126.

Bear in mind that the drawing figures are diagrammatic, with no inference or reference to retention structure for coupling the ends of the biasing member 130 to the valve seat 126 and the spring seat 136. It should be understood that the biasing member 130 is preferably in tension (i.e., biased to contract). That is to say, the biasing member 130 is preferably biased to urge the spring seat 136 away from the valve seat 126 and close the valve 128, and the valve 128 is preferably controlled to open by the weight, position and movement of the patient as desired to urge the valve 128 to the opened position. As stated above, it should be understood that, in accordance with this preferred embodiment, the biasing member 130 may be in compression, if positioned, for example, above the valve seat 126.

Returning now to FIG. 2, it should be appreciated that the backrest zone 106 may comprise at least one pneumatic cell 110 and the seat zone 108 may comprise at least one pneumatic cell 112 adjacent to the pneumatic cell 110 of the backrest zone 106. The mechanical valve assembly 118 may be located between the pneumatic cells 110 and 112 in any suitable manner.

Broadly presented, the invention controls pressure in air cells as a section of a mattress is raised, without electronic means, but by mechanical means (e.g., a pressure reducing valve (PRV) or control valve between cells in backrest and seat sections of the mattress).

That is to say, the invention provides means for controlling pressure automatically in cells of a pneumatic mattress mechanically, without electrical power, by virtue of a valve positioned in relation to a backrest section of a mattress, or corresponding portion of a bed deck, in a manifold or conduit between two cells. The valve may be in the form of a pressure reducing valve (PRV) or a check valve that has a weight element, which bears onto a sealing element of the valve. As the backrest angle is changed, force keeping the seal closed is overcome by influence of a weighted element via gravitational influence.

In operation, with the backrest section flat, there is a little extra force, and the pressure difference between cell groups is small. As the backrest section is raised, the force to open the valve increases and the pressure in the cell group controlled by the valve (i.e., in the seat section) increases or is sustained.

It should be understood that the invention has been explained and illustrated as an exemplary embodiment. However, it must be understood that the invention may be practiced otherwise than as specifically explained and illustrated without departing from its spirit or scope.

PARTS LIST

100 bed
102 frame
103 bed deck
104 mattress
106 backrest zone
108 seat zone
110 first pneumatic cell
112 second pneumatic cell
116 air supply manifold or conduit
118 mechanical valve assembly
120 backrest section
121 seat section
122 leg and foot sections
124 housing
126 valve seat
128 push valve
130 resilient valve biasing member
132 pusher
134 O-ring
136 spring seat
138 stem

What is claimed is:

1. A pneumatically inflatable mattress, comprising: at least a first pneumatic cell, at least a second pneumatic cell in fluid communication with the first pneumatic cell, and an automatically acting mechanical pressure control of pneumatic pressure supported in relation to the first pneumatic cell and the second pneumatic cell so as to selectively interfere with the fluid communication between the first pneumatic cell and the second pneumatic cell, the pressure control comprising: a mechanical valve assembly in series with a fluid communication between the first pneumatic cell and the second pneumatic cell, the mechanical valve assembly supported in relation to the first pneumatic cell and the second pneumatic cell and configured to automatically obstruct air flow by gravitational influence between the first pneumatic cell and the second pneumatic cell when the mechanical valve assembly moves to an upright or inclined position, and to automatically enable air flow between the first pneumatic cell and the second pneumatic cell when the mechanical valve assembly is in a horizontal position; wherein the mechanical valve assembly comprises: a housing, a valve seat coupled to the housing, a valve movable within the housing and located and configured to stop fluid communication through the housing when the valve seats against the valve seat in a closed position and to enable fluid communication through the housing in an open position when the valve has moved away from the valve seat, a resilient valve biasing member urging the valve into the open position, and a pusher configured to push the valve into the closed position responsive to gravity.

2. The pneumatically inflatable mattress of claim 1, wherein the pusher comprises a mass slidable within the housing, wherein the housing is configured to constrain the mass to slide against the valve when the backrest is in the upright or inclined position, thereby overcoming force of the resilient valve biasing member and closing the valve, and to slide away from the valve when a backrest is in the horizontal position, thereby enabling the resilient valve biasing member to open the valve and equalize pressure in the first pneumatic cell and the second pneumatic cell.

3. The pneumatically inflatable mattress of claim 2, wherein the housing is configured to enable the mass to slide progressively away from the valve as the backrest moves from the horizontal position to the upright or inclined position.

4. The pneumatically inflatable mattress of claim 2, further comprising a resilient seal between the valve and the valve seat.

5. The pneumatically inflatable mattress of claim 2, wherein:

the valve comprises a spring seat coupled to the valve and a stem spanning the valve and the spring seat and holding the spring seat at a fixed distance from the valve, and the resilient valve biasing member comprises a coil spring entrapped between the valve seat and the spring seat.

6. A bed having a backrest pivotable between a raised or inclined position and a horizontal position, a pneumatically inflated mattress, and automatically acting mechanical pressure control for controlling pneumatic pressure, the bed comprising: a frame; a pneumatically inflatable mattress supported in relation to the frame, the pneumatically inflatable mattress comprising a backrest and at least two zones including a backrest zone and a seat zone, at least one first pneumatic cell within the backrest zone, and at least one second pneumatic cell within the at least one seat zone; an air source configured to supply air; an air supply conduit between the at least one second pneumatic cell and the at least one first pneumatic cell to supply air via the air source between the at least one second pneumatic cell and the at least one first pneumatic cell; and a mechanical valve assembly in the air supply conduit, the mechanical valve assembly coupled to the backrest and configured to automatically obstruct air flow by gravitational influence between the at least one second pneumatic cell and the at least one first pneumatic cell when the backrest moves from a lowered position to a raised position, and to automatically enable air flow between the at least one second pneumatic cell and the at least one first pneumatic cell when the backrest moves from the raised position to the lowered position; wherein the mechanical valve assembly comprises: a housing, a valve seat coupled to the housing, a valve movable within the housing and located and configured to stop fluid communication through the housing when the valve seats against the valve seat in a closed position and to enable fluid communication through the housing in an open position when the valve has moved away from the valve seat, a resilient valve biasing member urging the valve into the open position, and a pusher configured to push the valve into the closed position responsive to gravity.

7. The bed of claim 6, wherein the pusher comprises a mass slidable within the housing, wherein the housing is configured to constrain the mass to slide against the valve when the backrest is in the raised position, thereby overcoming the resilient valve biasing member and closing the valve, and to slide away from the valve when the backrest is in the lowered position, thereby enabling the resilient valve biasing member to open the valve and equalize pressure between the at least one second pneumatic cell and the at least one first pneumatic cell.

8. The bed of claim 7, wherein the housing is configured to enable the mass to slide progressively away from the valve as the backrest moves from the lowered position to the raised position.

9. The bed of claim 7, further comprising a resilient seal between the valve and the valve seat.

10. The bed of claim 7, wherein:

the valve comprises a spring seat coupled to the valve and a stem spanning the valve and the spring seat and holding the spring seat at a fixed distance from the valve, and the resilient valve biasing member comprises a coil spring entrapped between the valve seat and the spring seat.

* * * * *